(12) United States Patent
Figarski et al.

(10) Patent No.: US 11,219,241 B2
(45) Date of Patent: Jan. 11, 2022

(54) BEAD FEEDING METHOD AND BEAD FEEDING UNIT

(71) Applicant: International Tobacco Machinery Poland Sp. z o. o., Radom (PL)

(72) Inventors: Radoslaw Figarski, Radom (PL); Bartosz Cieslikowski, Radom (PL); Robert Skierczynski, Radom (PL)

(73) Assignee: International Tobacco Machinery Poland Sp. z o. o., Radom (PL)

( * ) Notice: Subject to any disclaimer, the term of this patent is extended or adjusted under 35 U.S.C. 154(b) by 0 days.

(21) Appl. No.: 15/929,171

(22) Filed: Nov. 26, 2019

(65) Prior Publication Data
US 2020/0187554 A1 Jun. 18, 2020

(30) Foreign Application Priority Data
Dec. 17, 2018 (EP) .................................... 18212859

(51) Int. Cl.
| | | |
|---|---|---|
| A24D 3/02 | (2006.01) | |
| A24D 3/04 | (2006.01) | |
| A24D 3/06 | (2006.01) | |
| B65G 11/02 | (2006.01) | |
| B65G 45/12 | (2006.01) | |
| B65G 45/24 | (2006.01) | |

(52) U.S. Cl.
CPC .......... *A24D 3/0216* (2013.01); *A24D 3/048* (2013.01); *A24D 3/061* (2013.01); *B65G 11/023* (2013.01); *B65G 45/12* (2013.01); *B65G 45/24* (2013.01)

(58) Field of Classification Search
None
See application file for complete search history.

(56) References Cited

U.S. PATENT DOCUMENTS

| | | | |
|---|---|---|---|
| 7,757,835 B2 * | 7/2010 | Garthaffner | .......... A24D 3/0216 198/392 |
| 7,833,146 B2 | 11/2010 | Deal | |
| 7,975,877 B2 | 7/2011 | Garthaffner et al. | |
| 8,303,474 B2 * | 11/2012 | Iliev | ....................... A24D 3/061 493/47 |

(Continued)

FOREIGN PATENT DOCUMENTS

| | | |
|---|---|---|
| EP | 2622973 B1 | 3/2017 |
| WO | 2009/071271 A1 | 6/2009 |
| WO | 2009/071272 A1 | 6/2009 |

OTHER PUBLICATIONS

European Search Report in Application No. EP 18212859 dated May 6, 2019.

*Primary Examiner* — William R Harp
(74) *Attorney, Agent, or Firm* — Oppedahl Patent Law Firm LLC

(57) ABSTRACT

Bead feeding unit (1) on a production machine in the tobacco industry, provided with a unit of supply channels (4) feeding individual bead (2) streams from a store (2A) to holding pockets (14) situated at the outlets of the supply channels (4), a transferring unit (13) comprising two guiding discs (5,6) situated coaxially and movable feeding means (8) adapted to direct the beads to receiving channels (18) of the transferring unit (13). The unit (1) is characterised in that the transferring unit (13) has at least one cleaning element (25) adapted to clean the holding pockets (14).

12 Claims, 6 Drawing Sheets

(56) References Cited

U.S. PATENT DOCUMENTS

| | | | |
|---|---|---|---|
| 8,869,969 B2* | 10/2014 | Cie likowski | A24D 3/0216 198/479.1 |
| 8,925,708 B2* | 1/2015 | Cie likowski | A24C 5/02 198/397.02 |
| 9,004,261 B2* | 4/2015 | Cie likowski | A24D 3/0216 198/479.1 |
| 9,101,166 B2* | 8/2015 | Le Roux | A24D 3/0216 |
| 9,408,415 B2* | 8/2016 | Cie likowski | A24D 3/02 |
| 10,569,969 B2* | 2/2020 | Garthaffner | A24D 3/0216 |
| 2007/0068540 A1 | 3/2007 | Thomas et al. | |
| 2011/0053745 A1 | 3/2011 | Iliev et al. | |
| 2013/0181003 A1* | 7/2013 | Cieslikowski | A24D 3/0216 221/1 |

* cited by examiner

BEAD FEEDING METHOD AND BEAD FEEDING UNIT

BACKGROUND

The object of the application is a bead feeding method and a bead feeding unit used in the filters of the tobacco industry products, in particular cigarettes.

This invention concerns feeding of spherical or oval objects which are subsequently placed into filter material. For the sake of simplification, such objects will be hereinafter referred to as beads. A known product on the market are cigarettes the filters of which are provided with beads containing aromatic or odorous substances. The substances contained in the beads are released during smoking or yet before lighting up a cigarette by squeezing of the filter which results in crushing the bead.

In the production process, a problem which is difficult to solve and at the same time very significant is the feeding of individual beads to a machine forming filters at great speeds in a way which guarantees that the beads remain undamaged, the flow in the pockets holding the beads remains undisturbed and a high feeding efficiency is maintained, i.e. each manufactured filter actually contains a bead.

In known bead feeders, tubes for feeding the beads to the area from which they are transferred to a bead delivery wheel are used, whereas the function of the said wheel is to place the delivered beads into the filter material.

In the U.S. Pat. No. 7,975,877B2 a bead feeder is disclosed in which the bead feeding unit is provided with a plurality of tubes which are radially connected with a cylindrical bowl, whereas the tubes rotate together with the bowl, and the beads are picked up by a vacuum bead transfer wheel from pockets situated at the outlets of the tubes, and then transferred to a bead delivery wheel from which they are delivered to the filter material.

The document WO 2009/071271 discloses a bead feeder in which the bead feeding unit is provided with tubes rotating with the bowl, whereas the beads are fed to a bead delivery wheel after separating the lowermost bead from those situated above it using a stationary arched wedge-ended element. After passing through the passageway the beads are fed to the pockets of the bead delivery wheel which delivers them to the filter material.

The document WO 2009/071272 discloses a similar bead feeder, whereas the beads are fed to the bead delivery wheel using two discs having a plurality of openings and rotating relative to each other, and a bead is fed after aligning respective openings directly on top of each other and forming successive passageways to the pockets of the bead delivery wheel.

The U.S. Pat. No. 7,833,146B2 shows an apparatus for feeding beads through curved tubes from a bowl directly to the bead delivery wheel, where the tubes rotate together with the bead bowl, and the beads are picked up from the bowl by vacuum transfer.

The patent EP 2 622 973B1 shows an apparatus for feeding beads in individual streams from the bowl through channels to pockets situated on the receiving wheel, then the beads are transferred to the pockets situated on the delivery wheel from which they are delivered to the filter material.

The bead feeders presented above require that during the operation the bead feeding tubes and the bead holding pockets must be free of dirt in order to realize an undisturbed flow. The objective of the invention is to develop a bead feeding method and a bead feeder ensuring an undisturbed flow through the channels and the bead holding pockets.

SUMMARY OF THE INVENTION

The object of the invention is a bead feeding unit in a production machine in the tobacco industry, provided with a unit of supply channels feeding streams of beads from a store to holding pockets situated at the outlets of the supply channels, a transferring unit comprising at least one guiding disc and a movable feeding means adapted to direct the beads to receiving pockets of the transferring unit. The unit according to the invention is characterised in that the transferring unit has at least one cleaning element adapted to clean the holding pockets.

The unit according to the invention is further characterised in that the cleaning element is situated on the movable feeding means.

The unit according to the invention is further characterised in that the cleaning element is situated on the movable feeding means on a cam underneath a pushing segment.

The unit according to the invention is further characterised in that the cleaning element has the form of a scraper adapted to sink into a holding pocket or a nozzle blowing compressed air or a sucking mouthpiece using vacuum or a combination of the above means.

The unit according to the invention is further characterised in that the movable feeding means are situated between two guiding discs.

The unit according to the invention is further characterised in that the movable feeding means have channels supplying compressed air to the holding pockets to the cleaning element.

The unit according to the invention is further characterised in that the movable feeding means have channels supplying vacuum to the holding pockets to the cleaning element.

The unit according to the invention is further characterised in that the channels supplying the compressed air or vacuum are situated behind the cleaning element.

The unit according to the invention is further characterised in that the movable feeding means have at least one pushing edge, whereas the cleaning element is situated on the movable feeding means behind the pushing edge.

The object of the invention is also a method of feeding the beads in a bead feeding unit in the tobacco industry, the unit being provided with supply channels feeding streams of beads, comprising the steps in which: the beads are transferred along supply channels; the beads from individual supply channels are placed into first holding pockets. Then by means of movable means the beads are fed from the holding pockets to receiving pockets of the bead transferring unit. The beads are taken from the receiving pockets by means of at least one guiding disc, and the beads are transferred to removing pockets through guiding channels.

The method according to the invention is characterised in that after transferring the beads from the holding pockets to the receiving pockets the holding pockets are cleaned by means of at least one cleaning element.

The method according to the invention is characterised in that the holding pockets are cleaned by inserting the cleaning element into such pockets.

The method according to the invention is characterised in that after inserting the cleaning element into the holding pockets compressed air is supplied in order to blow out the dirt from the holding pockets.

The method according to the invention is characterised in that after inserting the cleaning element into the holding pockets vacuum is supplied in order to suck the dirt from the holding pockets.

The object of the invention is further a method of feeding beads in a feeding unit in a tobacco industry machine, comprising the steps wherein: the beads are transferred along individual supply channels from a bead store to holding pockets of a bead feeding unit. Then the beads from individual supply channels are placed into first holding pockets. By means of a movable means the beads are fed from the holding pockets to receiving pockets of a bead transferring unit. The beads are taken from the receiving pockets by means of at least one guiding disc, and the beads are transferred to removing pockets through guiding channels. The method according to the invention is characterised in that before placing the beads in the holding pockets and before transferring the beads from the holding pockets to the receiving pockets the holding pockets are cleaned by means of at least one cleaning element.

The bead feeding unit according to the invention is provided with cleaning elements adapted to clean the bead holding pockets so that the number of machine stoppages resulting from dirty or blocked holding pockets was significantly reduced. Furthermore, such solution ensures that each manufactured filter will contain a bead.

DESCRIPTION OF THE DRAWING

The object of the invention was shown in detail in a preferred embodiment in a drawing in which.

DETAILED DESCRIPTION

Figure 1:
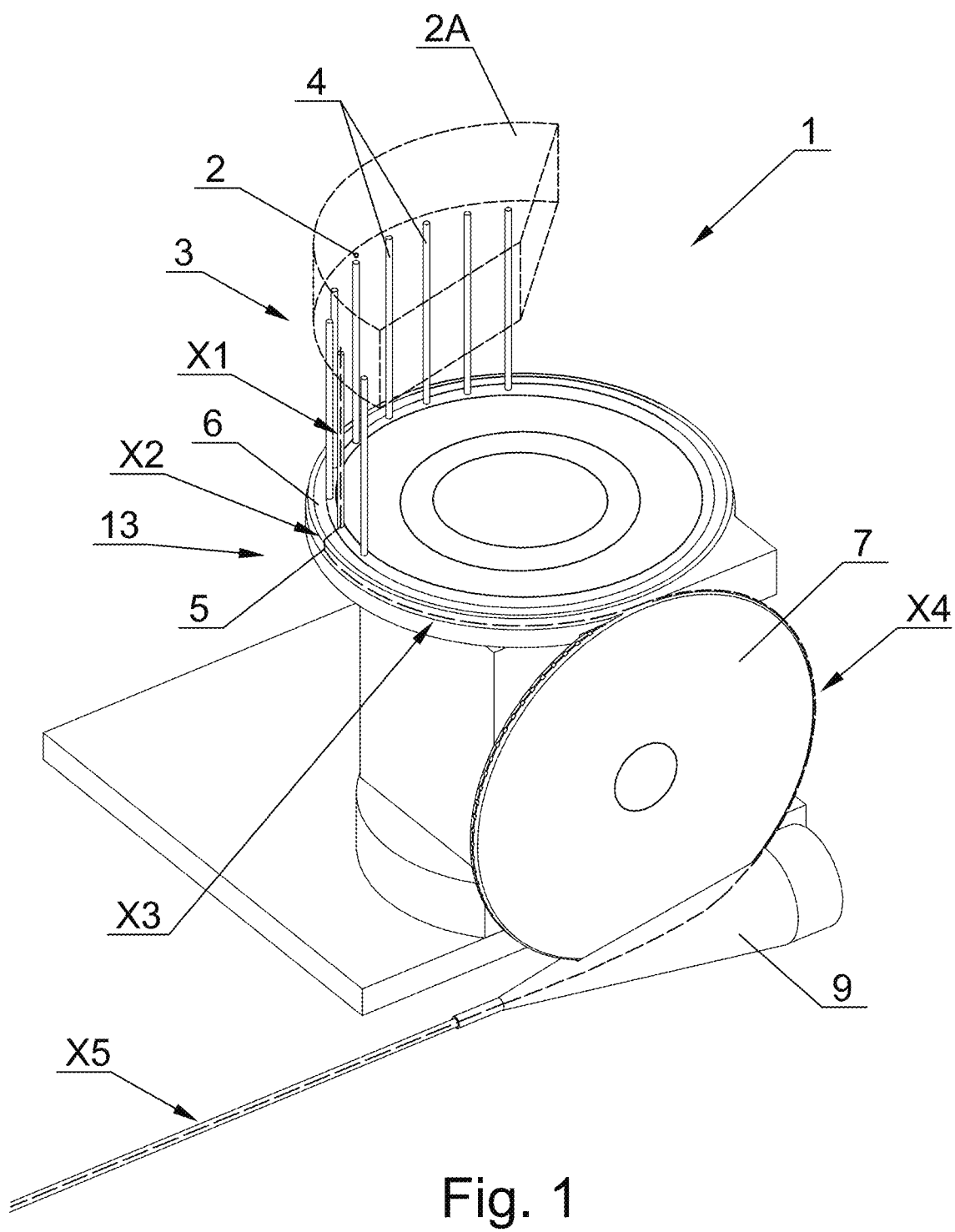
FIG. 1 shows a bead feeding unit in a perspective view.

FIG. 1 shows a bead 2 feeding unit 1 provided with a store 2A for storing beads 2, a bead stream feeding unit 3, a unit 13 for transferring the beads to a delivery wheel 7 and the wheel 7 delivering the beads 2 to a continuous filter material conveyed along a funnel 9. The filter material may also have the form of segments transported at intervals on the wrapper between which the beads are inserted. For the sake of simplification, the elements fastening individual units were not shown.

The bead 2 feeding unit 3 is provided with a plurality of stationary channels in the form of channels 4 to which beads 2 from the store 2A are supplied, whereas one bead 2 above the inlet of one of the channels was shown. At the outlets of the channels 4, there are situated first holding pockets 14 (FIG. 3) from which the beads are transferred to second receiving pockets 18 (FIG. 4) which receive the beads 2; the seconds pockets 18 are situated in the area between a first guiding disc 5 and a second guiding disc 6, whereas the guiding discs 5 and 6 belong to the unit 13 for transferring the beads 2 to the delivery wheel 7. After passing through a guiding channel 19 between the disc 5 and the disc 6, the beads 2 are transferred further to receiving pockets 21, and then placed into the pockets on the circumference of the delivery wheel 7 which places the beads 2 into a filter material conveyed in the funnel 9 (FIG. 1). A thick broken line shows the distance covered by the bead in all embodiments described herein. Such bead 2 moves from the store 2A downwards in one of the channels 4 to the holding pocket 14, in the drawing, this section of the distance is marked with X1. The next section of the distance from the holding pocket 14 via the receiving pocket 18 to the removing pocket 21 is marked with X2. In the next section of the distance X3 the bead is conveyed along an arc in the pocket 21 to a place at which the bead is transferred onto the delivery wheel 7. In the section X4, the bead is further conveyed in the pocket on the wheel 7. Then it is placed into the filter material within the funnel 9 and further moves along the last section of the distance X5.

Figure 2:
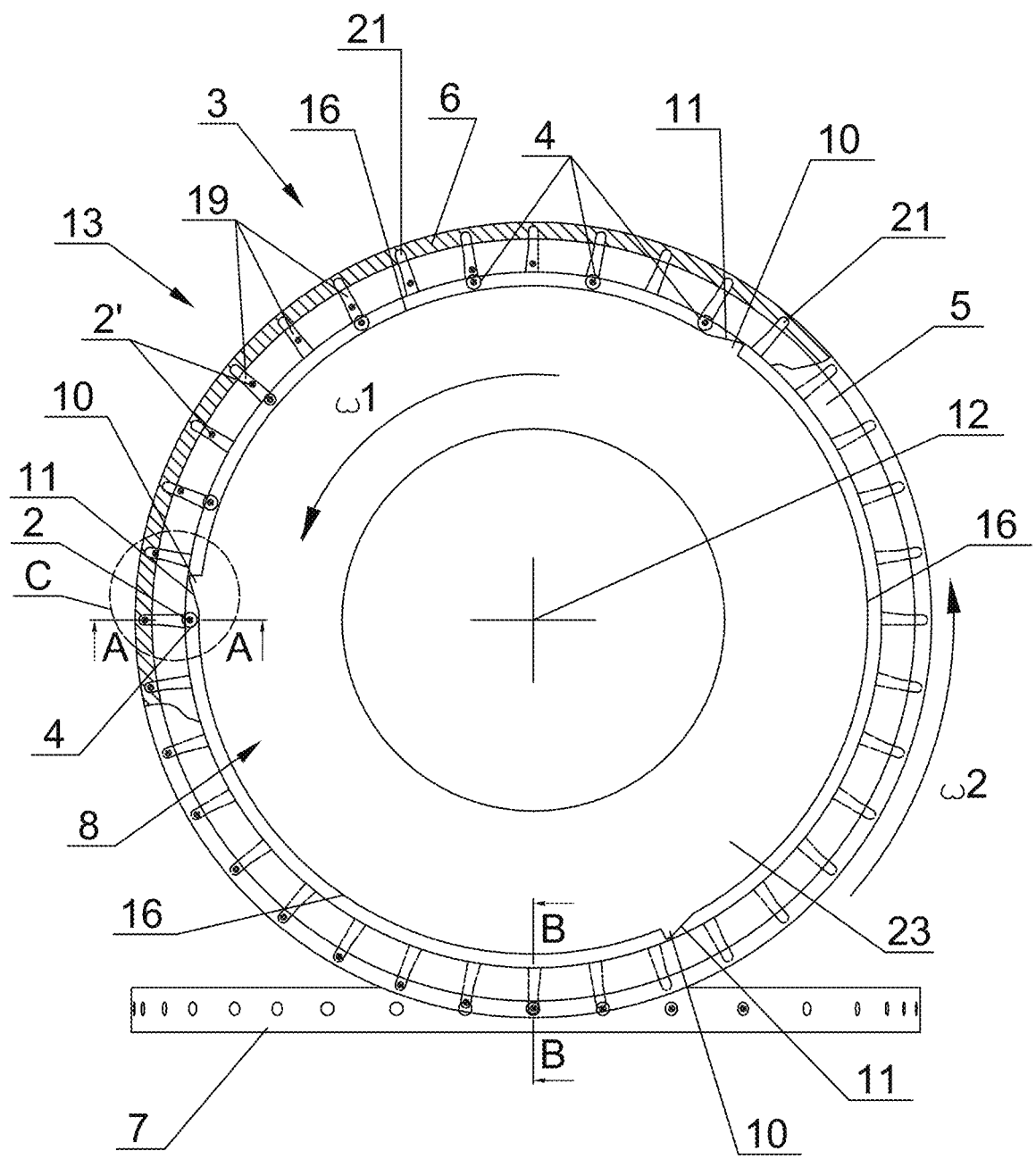
FIG. 2 shows a fragment of the bead feeding unit in a first embodiment, in a top view.

FIG. 2 shows a fragment of the bead feeding unit 1 according to the invention in the first embodiment. In a top view, the bead feeding unit 3 and the unit 13 for transferring the beads 2 to the wheel 7 are shown. The bead feeding unit 3 is provided with a plurality of channels 4, whereas all channels 4 are filled with the beads 2 (in view of proportionally small dimensions of the beads, in the drawing they are shown in the form of shaded small circles). For the sake of simplification, the elements fastening the channels 4 to the frame of the unit 1 and the drive elements are not shown. The bead feeding unit 3 is provided with a rotatable feeding means 8 in the form of a cam 23 comprising pushing segments 10 having pushing edges 11, whereas the cam 8 rotates with a speed ω1 around the axis of rotation 12, and the pushing segments 10 move along a circular path in the area of the outlets of the channels 4 being the area of the holding pockets 14. In the embodiment shown, the guiding channels 19 together with the pockets 18 are situated in the disc 6 which rotates at the speed ω2 lower than the speed ω1. During the operation of the bead feeding unit, the motion of the segments 10 disposed on the rotating cam 23 and the motion of the pockets 18 are synchronized in order to enable inserting the beads 2' into the pockets 18 situated at the beginning of the channels 19, whereas the speeds ω1 and ω2 are selected in such a way that during the operation of the unit the pushing segments 10 cause inserting the beads into successive pockets 18 in the guiding channels 19. It may be achieved when the guiding channel 19 is situated relative to the outlet of the channel 4 and the first holding pocket 14 in such a way that renders transferring of a bead 2' possible, for example the pocket 18 receiving the bead may be situated substantially radially to the holding pocket 14. The unit is shown in a situation where several beads 2 have already been placed into the guiding channels 19, and some of the beads have been placed in the removing pockets 21 by centrifugal force.

Figure 3:
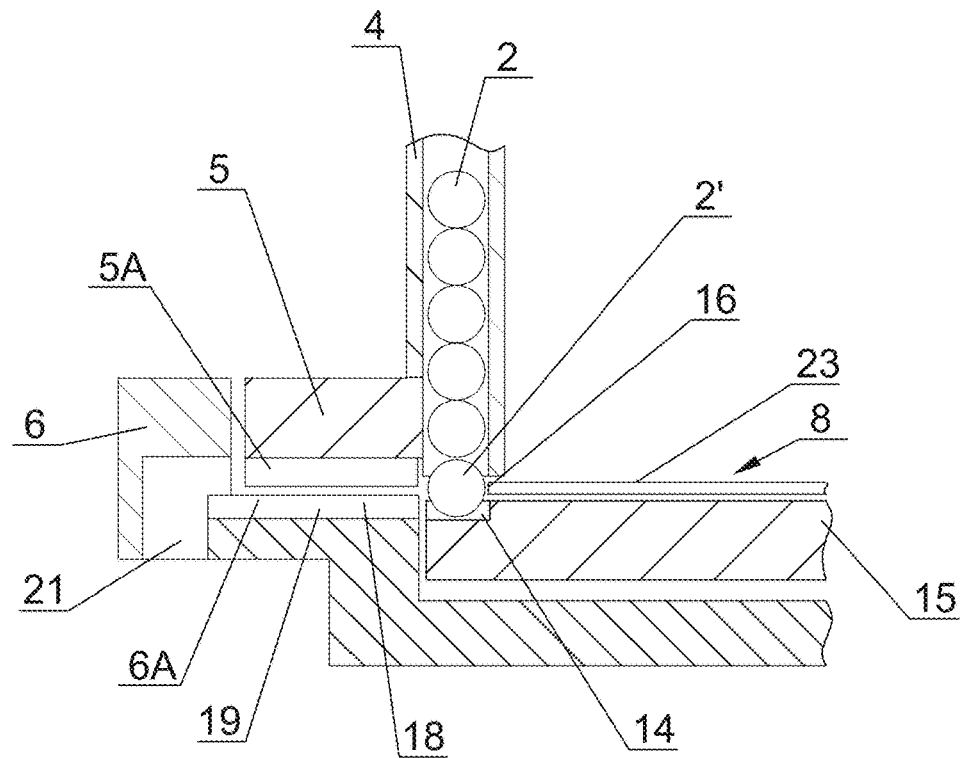
FIG. 3 shows a sectional view of a holding pocket in a first embodiment of a guiding channel, marked in FIG. 2 as A-A, after pushing a bead out of the holding pocket.

FIG. 3 shows a sectional view of any channel 4 where for example in FIG. 2 the section was marked as A-A. The lowermost bead 2' in the bead column is situated in the holding pocket 14 disposed at the outlet of the vertical channel 4, limited from below by the disc 15, and on the sides by the disc 5 and the circumferential edge 16 of the cam 23.

Figure 4:
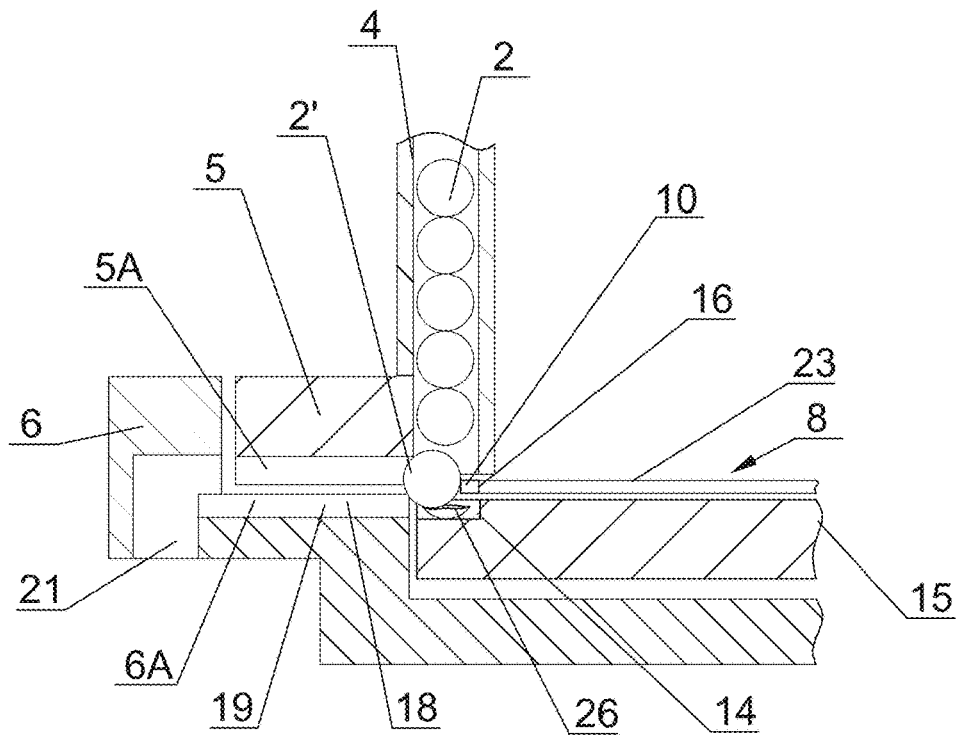
FIG. 4 shows a sectional view of the holding pocket after inserting the bead into the holding pocket with a piece of a damaged bead.

FIG. 4 shows a sectional view of the channel 4 when a piece of a damaged bead 26 of the channel 4 gets into the pocket 14, and the bead 13 feeding unit does not have a cleaning element 25. The fragment of the damaged bead 26 lying at the bottom of the holding pocket 14 causes an improper arrangement of the bead 2' in the pocket, which results in the bead being damaged when pushing it by the feeding means into the guiding channel 19. In order to prevent it, the feeding means 23 is provided with the cleaning element 25 shown in the successive figures.

Figure 5:
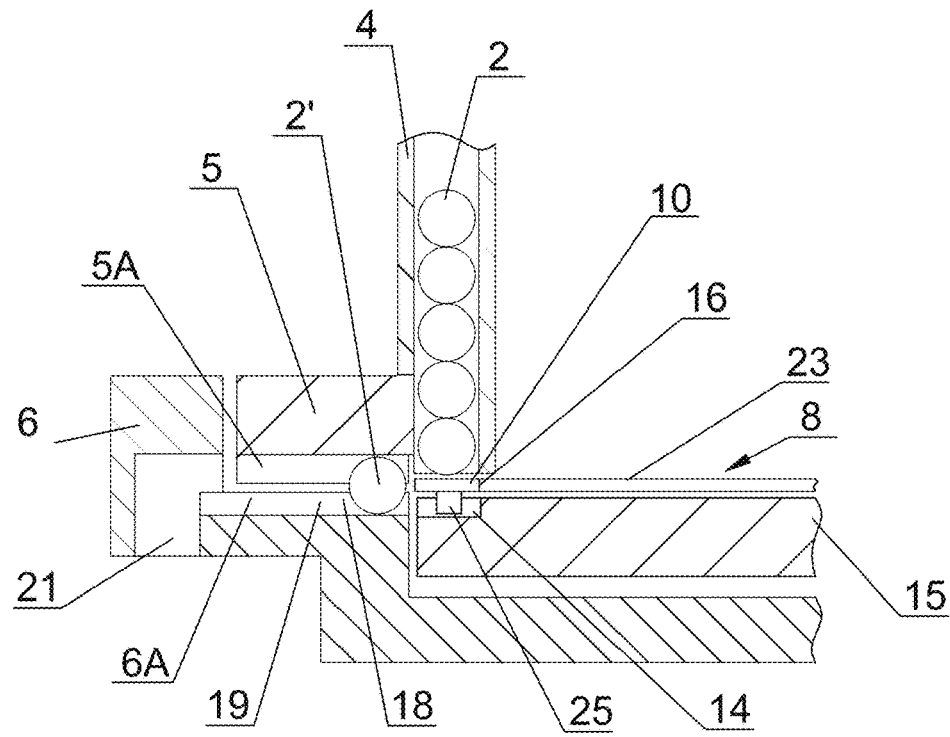
FIG. 5 shows a sectional view of the holding pocket of the bead feeding unit with a cleaning element.
Figure 5A:
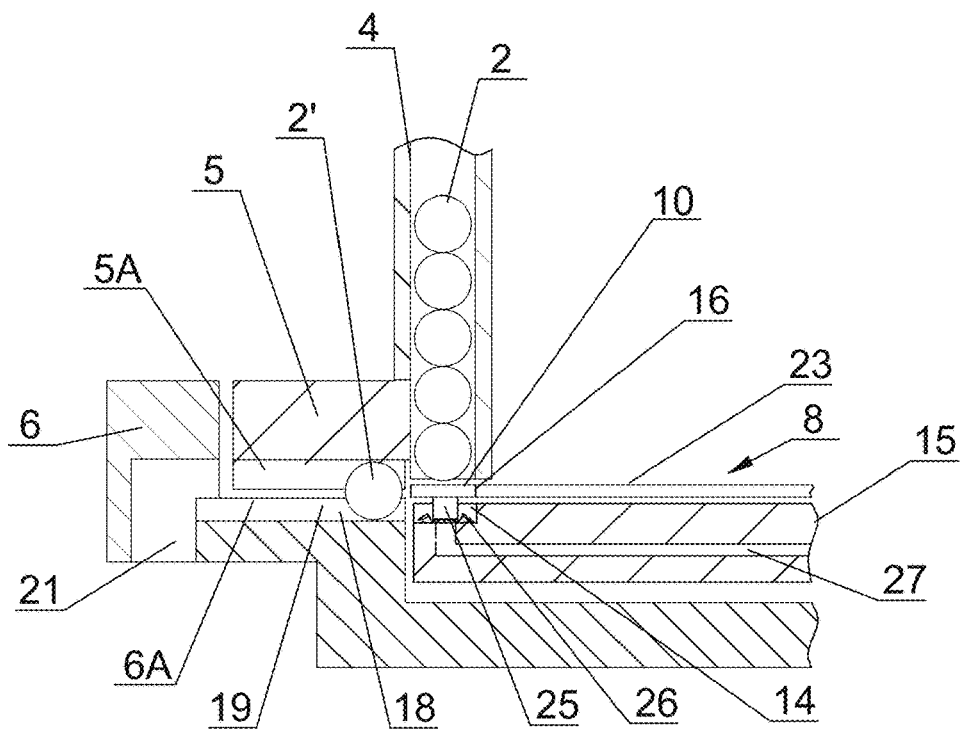
FIG. 5a shows a sectional view of the holding pocket of the bead feeding unit with the cleaning element grinding a damaged bead in the holding pocket.
Figure 5B:
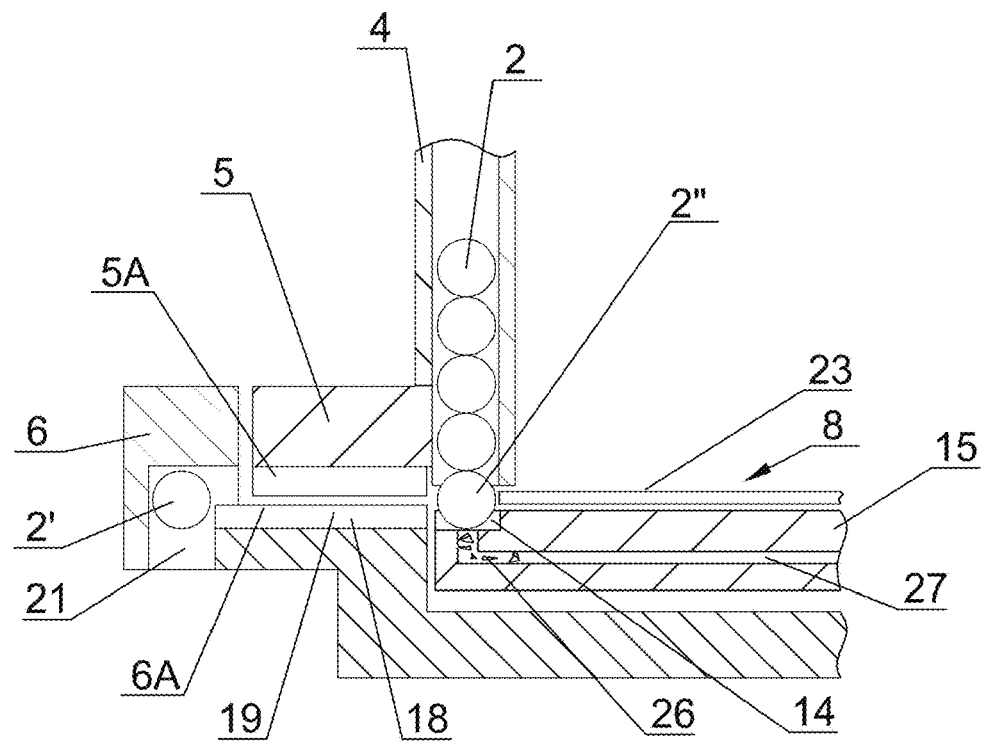
FIG. 5b shows a sectional view of the holding pocket of the bead feeding unit when removing a damaged bead from the holding pocket through a channel with the use of vacuum.
Figure 5C:
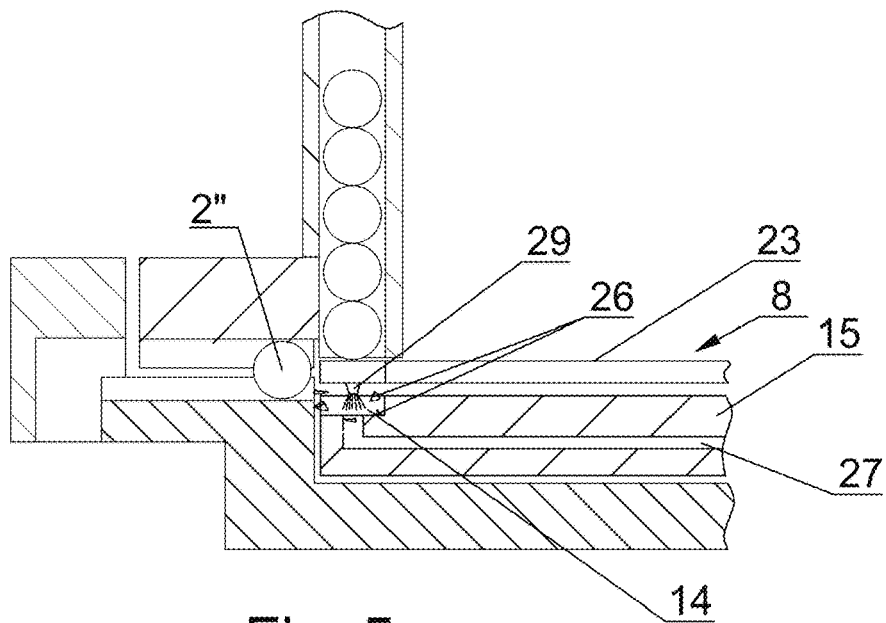
FIG. 5c shows a sectional view of the holding pocket of the bead feeding unit when removing a damaged bead from the holding pocket by means of compressed air.
Figure 6:
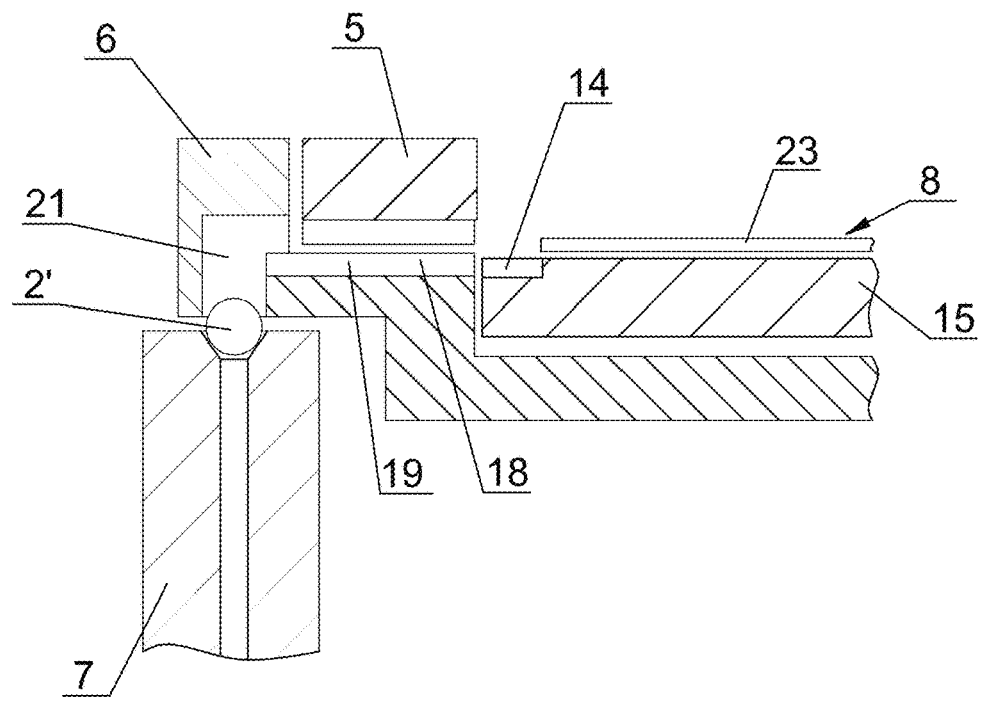
FIG. 6 shows a sectional view of a receiving pocket, marked in FIG. 2 as B-B, when feeding the bead onto a receiving wheel.

FIG. 5 shows a sectional view of the channel 4 in a situation where the pushing segment 10, moving along a circular path in the area of the first holding pockets 14, during the rotation of the cam 23 has passed a successive pocket 14 beneath a successive channel 4 and caused pushing of the bead 2' out of the first pocket 14 to the second receiving pocket 18 in the area between the first guiding disc 5 and the second guiding disc 6. After pushing the bead 2' out of the holding pocket 14, the cleaning element 25 is inserted into the pocket in order to clean the holding pocket 14 of the pieces of damaged beads 26 or other deposited impurities, which is successively shown in FIGS. 5a, 5b and 5c. The method of feeding beads 2 in the bead feeding unit 3 in the tobacco industry, the unit being provided with supply channels 4 feeding streams of the beads 2, consists in conveying the beads 2 along the supply channel 4 and then placing the bead 2' from individual supply channels 4 in the first holding pockets 14. After placing the beads 2' in the pockets 14 by the means of movable means 8, the beads 2' are fed from the holding pockets 14 to the receiving pockets 18 of the bead 13 transferring unit. Then the beads 2' are taken from the receiving pockets 18 by means of the guiding discs 5, 6 and transferred to the removing pockets 21 through the guiding channels 19. After transferring the beads 2' from the holding pockets 14 to the receiving pockets 18, the holding pockets 14 are cleaned by means of at least one cleaning element 25. Since the beads used in the tobacco industry contain taste and aromatic substances, their damage may result in such substance getting into the holding pocket 14, the channels 4 or the guiding channel 19, thus enabling the pieces of damaged beads and other dirt to stick around. Therefore, an advantageous solution will be the cleaning element 25 in the form of a stable projection which sinks so deep into the pocket 14 that it may completely remove, grind or move a fragment of damaged bead so that it may be later more easily removed from the pocket. It is also possible that the cleaning element 25 takes the shape of rigid brushes or another elastic element which will sink into the pocket 14 and remove any impurities. The cleaning element 25 in this embodiment is fastened to the feeding means 8 in the form of the rotatable cam 23 in the area of the pushing segment 10. An inclination of the guiding channel 19 which may be achieved by a conical shape of the discs 5 and 6 is also possible. Any fragmented pieces of the damaged bead 26 may be removed from the pocket 14 using the vacuum through the channel 27 situated in the disc 15 (FIG. 5b), blown by compressed air by means of a nozzle 29 out of the holding pocket 14 as shown in FIG. 5c or removed by vacuum through the channel 28 (shown in FIG. 7) situated behind the cleaning element 25 in the cam 23 of the transferring unit 13. It is also possible that the cleaning element takes the shape of the channel 27 situated in the disc 15 which could fulfil two functions: by supplying vacuum hold the bead 2' in the pocket 14 until it is pushed by the cam 23, and after transferring it to the channel 19, by supplying for example compressed air, clean the pocket 14 before feeding the next bead to it. Then the bead 2' is conveyed substantially horizontally in the guiding channel 19, transferred to the receiving pocket 21 and further to the pocket on the delivery wheel 7 as shown in FIG. 6

Figure 7:
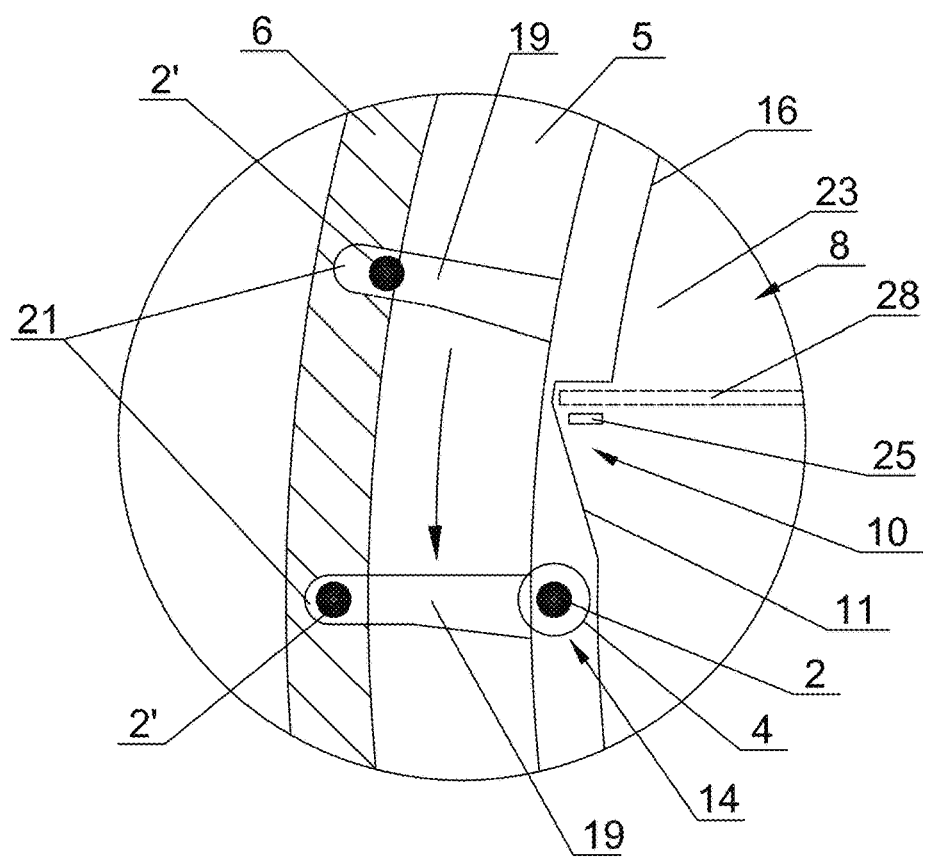
FIG. 7 shows a magnified fragment C of the bead feeding unit of FIG. 2 in a top view.

FIG. 7 shows a magnified fragment of the area C of FIG. 2 of a part of the bead feeding unit 13 in a top view in which the precise position of the cleaning element 25 on the feeding means 8 is visible. The cleaning element 25 is situated in the region of the pushing edge 11 so that just after pushing the bead 2 out of the holding pocket 14 situated beneath the channel 4 it may sink into the emptied pocket 14 before the next bead from the channel 4 enters the holding pocket 14. It may be achieved only if between the channel 4 with the bead 2 stream and the holding pocket 14 the pushing segment 10 of the cam 23 is situated which, when pushing the bead 2 to the channel 19, will stop the flow of the next bead from the channel 4 to the pocket 14. Moreover, in the feeding means 8 behind the cleaning element 25 there may be situated a channel 28 supplying compressed air or vacuum in order to remove the pieces of the damaged bead 26 fragmented by the cleaning element 25.

The invention claimed is:

1. A bead feeding unit (1) in a production machine in the tobacco industry, provided with
    a unit of vertical supply channels (4) feeding streams of beads (2) from a store (2A) to holding pockets (14) situated at the outlets of the supply channels (4) and limited from below by a disc (15),
    a transferring unit (13) comprising at least one guiding disc (5, 6) and a movable feeding means (8) adapted to direct the beads to receiving pockets (18) of the transferring unit (13), wherein
    the transferring unit (13) has at least one cleaning element (25) adapted to clean the holding pockets (14) situated at the outlets of the vertical supply channels (4) and limited from below by the disc (15), wherein the cleaning element (25) is situated on the movable feeding means (8).

2. The unit (1) as in claim 1, wherein the cleaning element (25) is situated on the movable feeding means (8) on a cam (23) underneath a pushing segment (10).

3. The unit (1) as in claim 1, wherein the cleaning element (25) has the form of a scraper adapted to sink into the holding pocket (14) or a nozzle blowing compressed air or a sucking mouthpiece using vacuum or a combination of the above means.

4. The unit (1) as in claim 1, wherein the movable feeding means (8) is situated between two guiding discs (5,6).

5. The unit (1) as in claim 1, wherein the movable feeding means (8) has channels supplying compressed air to the holding pockets (14) to the cleaning element (25).

6. The unit (1) as in claim 5, wherein the channels supplying compressed air or vacuum are situated behind the cleaning element (25).

7. The unit (1) as in claim 1, wherein the movable feeding means (8) has channels supplying vacuum to the holding pockets (14) to the cleaning element (25).

8. The unit (1) as in claim 1, wherein the movable feeding means (8) has at least one pushing edge (11), whereas the cleaning element (25) is situated on the movable feeding means (8) behind the pushing edge (11).

9. A method of feeding beads (2) in a bead feeding unit in the tobacco industry, the unit being provided with supply channels feeding streams of beads, comprising steps of:
    transferring the beads along supply channels;

placing the beads from individual vertical supply channels into first holding pockets (14) situated at the outlets of the vertical supply channels (4) and limited from below by a disc (15);

feeding the beads from the holding pockets (14) to receiving pockets (18) of the bead transferring unit (13) by a movable means (8);

taking the beads from the receiving pockets (18) by at least one guiding disc (5, 6) and transferring the beads to removing pockets (21) through guiding channels (19);

and cleaning the holding pockets (14) situated at the outlets of the vertical supply channels (4) and limited from below by the disc (15) after transferring the beads from the holding pockets (14) to the receiving pockets (18) by at least one cleaning element (25), wherein the cleaning of the holding pockets (14) is done by inserting the cleaning element (25) into such pockets.

10. The method as in claim 9, wherein after inserting the cleaning element (25) into the holding pockets (14), compressed air is supplied in order to blow out the dirt from the holding pockets (14).

11. The method as in claim 9, wherein after inserting the cleaning element (25) into the holding pockets (14), a vacuum is supplied in order to suck the dirt from the holding pockets (14).

12. A method of feeding beads in a feeding unit in a tobacco industry machine comprising steps wherein:

transferring the beads along individual vertical supply channels from a bead store to holding pockets (14) of a bead feeding unit (3);

placing the beads from individual channels into first holding pockets (14) situated at the outlets of the vertical supply channels (4) and limited from below by a disc (15);

feeding the beads from the holding pockets (14) to receiving pockets (18) of a bead transferring unit (13) by a movable means (8);

taking the beads from the receiving pockets (18) by at least one guiding disc (5, 6) and transferring the beads to removing pockets (21) through guiding channels (19);

and cleaning the holding pockets (14) situated at the outlets of the supply channels (4) and limited from below by the disc (15) before placing the beads in the holding pockets (14) by at least one cleaning element (25), wherein the cleaning of the holding pockets (14) is done by inserting the cleaning element (25) into such pockets.

* * * * *